US011900845B2

(12) United States Patent
Xiong et al.

(10) Patent No.: US 11,900,845 B2
(45) Date of Patent: Feb. 13, 2024

(54) SYSTEM AND METHOD FOR OPTICAL CALIBRATION OF A HEAD-MOUNTED DISPLAY

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 17/696,729

(22) Filed: Mar. 16, 2022

(65) Prior Publication Data

US 2023/0137199 A1 May 4, 2023

Related U.S. Application Data

(60) Provisional application No. 63/272,889, filed on Oct. 28, 2021.

(51) Int. Cl.
*G09G 3/20* (2006.01)

(52) U.S. Cl.
CPC ... *G09G 3/2003* (2013.01); *G09G 2320/0242* (2013.01); *G09G 2320/0285* (2013.01)

(58) Field of Classification Search
None
See application file for complete search history.

(56) References Cited

U.S. PATENT DOCUMENTS

| | | | |
|---|---|---|---|
| 7,889,234 B2 | 2/2011 | Williams et al. |
| 8,743,214 B2 | 6/2014 | Grossmann et al. |
| 10,268,290 B2 | 4/2019 | Trail et al. |
| 10,915,148 B1 | 2/2021 | Richards et al. |

(Continued)

FOREIGN PATENT DOCUMENTS

| | | |
|---|---|---|
| CN | 104436634 B | 9/2017 |
| CN | 104809739 B | 3/2019 |

(Continued)

OTHER PUBLICATIONS

International Search Report and Written Opinion of the International Searching Authority dated Jan. 18, 2023 in connection with International Patent Application No. PCT/KR2022/016665, 9 pages.

*Primary Examiner* — Yingchun He

(57) ABSTRACT

A system and method for display distortion calibration are configured to capture distortion with image patterns and calibrate distortion with ray tracing for an optical pipeline with lenses. The system includes an image sensor and a processor to perform the method for display distortion calibration. The method includes generating an image pattern to encode display image pixels by encoding display distortion associated with a plurality of image patterns. The method also includes determining a distortion of the image pattern resulting from a lens on a head-mounted display (HMD) and decoding the distorted image patterns to obtain distortion of pixels on a display. A lookup table is created of angular distortion of all the pixels on the display. The method further includes providing a compensation factor for the distortion by creating distortion correction based on the lookup table of angular distortion.

20 Claims, 11 Drawing Sheets

(56) References Cited

U.S. PATENT DOCUMENTS

| | | | |
|---|---|---|---|
| 10,937,129 B1 | 3/2021 | Fix et al. | |
| 2011/0043667 A1* | 2/2011 | Kotani | H04N 23/71 348/241 |
| 2013/0169943 A1 | 7/2013 | Wen et al. | |
| 2019/0005607 A1 | 1/2019 | Tamai | |
| 2019/0306383 A1* | 10/2019 | Liu | H04N 25/61 |
| 2020/0053277 A1 | 2/2020 | Shin et al. | |
| 2020/0107013 A1* | 4/2020 | Hudman | H04N 13/296 |
| 2021/0183102 A1 | 6/2021 | Tang et al. | |

FOREIGN PATENT DOCUMENTS

| | | | |
|---|---|---|---|
| CN | 111010560 A | | 4/2020 |
| CN | 108665445 B | | 9/2020 |
| CN | 113489967 A | | 10/2021 |
| JP | 2020182127 A | * | 11/2020 |
| KR | 10-2019-0040633 A | | 4/2019 |

* cited by examiner

SYSTEM AND METHOD FOR OPTICAL CALIBRATION OF A HEAD-MOUNTED DISPLAY

CROSS-REFERENCE TO RELATED APPLICATION AND CLAIM OF PRIORITY

This application claims priority under 35 U.S.C. § 119(e) to U.S. Provisional Patent Application No. 63/272,889 filed on Oct. 28, 2021. The above-identified provisional patent application is hereby incorporated by reference in their entireties.

TECHNICAL FIELD

This disclosure relates generally to computer vision and platforms for augmented reality (AR) and extended reality (XR). More specifically, this disclosure relates to a system and method for optical calibration of a head-mounted display.

BACKGROUND

Augmented reality and extended reality experiences, which incorporate digitally controlled content into a user's view of an operating environment (e.g., a real-world environment) through an AR or XR apparatus (for example, a head-mounted display) present unique challenges in terms presenting images from real world and digital sources. Extended reality devices may display a combination of images from the real world and images from the virtual world. When the images from the real world and the images from the virtual world do not properly overlap with each other, users may experience motion sickness or become distracted due to the distortions in the images.

SUMMARY

This disclosure provides a system and method for optical calibration of a head- mounted display.

In a first embodiment, a method is provided. The method includes generating an image pattern to encode display image pixels. The method also includes determining a distortion of the image pattern resulting from a lens on a head-mounted display (HMD). The method further includes providing a compensation factor for the distortion.

In a second embodiment, an apparatus is provided. The apparatus includes an image sensor and a processor. The processor is configured to generate an image pattern to encode display image pixels. The processor also is configured to determine a distortion of the image pattern resulting from a lens on a head-mounted display (HMD). The processor is further configured to provide a compensation factor for the distortion.

In a third embodiment, a non-transitory computer-readable medium is provided. The non-transitory computer-readable medium contains instructions that, when executed by a processor, cause the processor to: generate an image pattern to encode display image pixels; determine a distortion of the image pattern resulting from a lens on a head-mounted display (HMD); and provide a compensation factor for the distortion.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory"computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
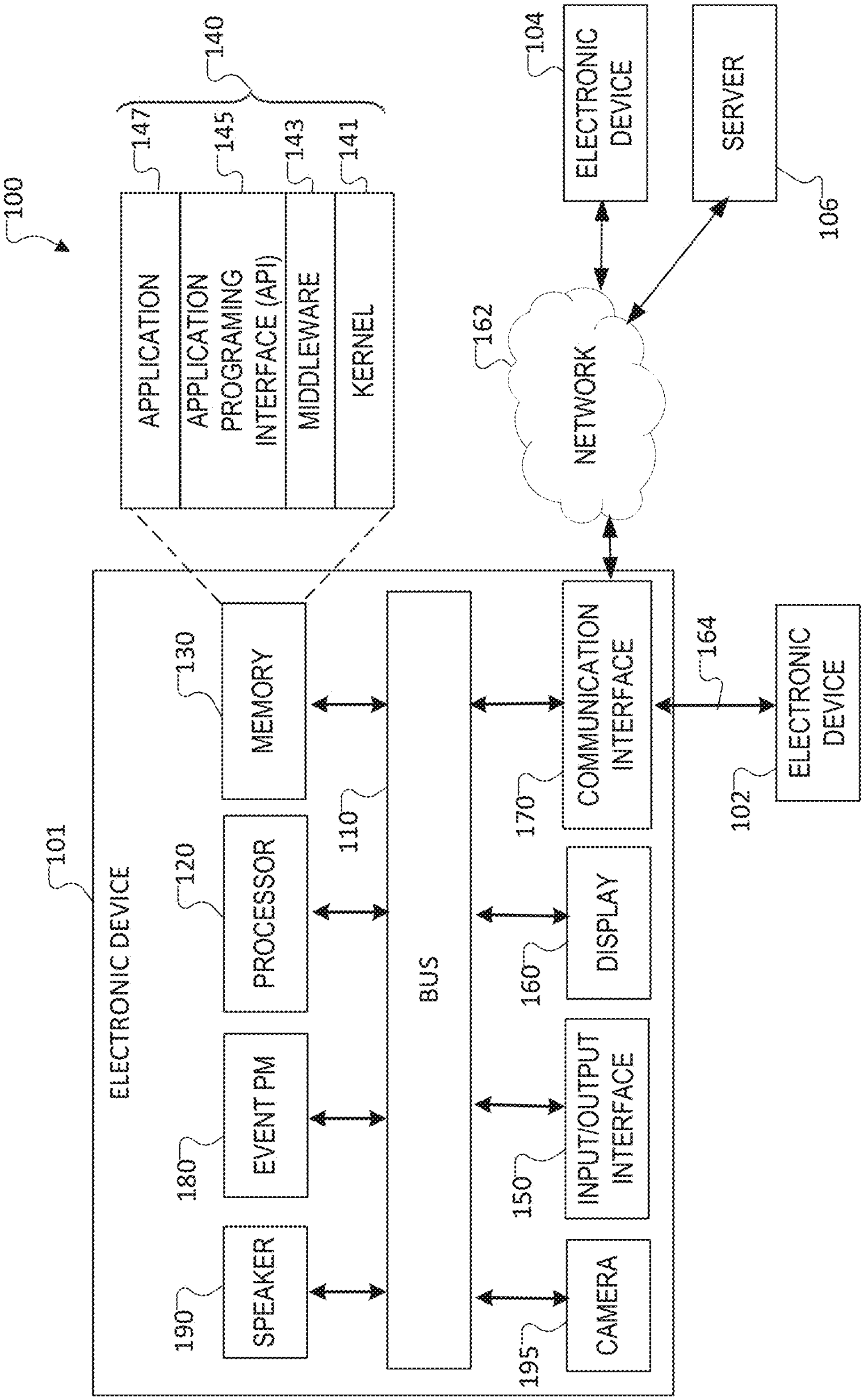
FIG. 1 illustrates an example network configuration including an electronic device according to an embodiment of the present disclosure.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

In certain embodiments, electronic device 101 is operating as a platform for providing an XR experience according to some embodiments of this disclosure. According to various embodiments of this disclosure, electronic device 101 could be implemented as one or more of a smartphone, a tablet, or a head-mounted device (HMD) for providing an augmented reality (AR) experience. In some embodiments, electronic device 101 is a wearable device. In certain embodiments, electronic device 101 is configured to couple to a second electronic device 102, which may be a wearable device such as an HMD.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

Applications 147 can include games, social media applications, applications for geotagging photographs and other items of digital content, extended reality (XR) applications, operating systems, device security (e.g., anti-theft and device tracking) applications or any other applications which access resources of electronic device 101, the resources of electronic device 101 including, without limitation, speaker 190, microphone, input/output interface 150, and additional resources. According to some embodiments, applications 147 include applications which can consume or otherwise utilize identifications of planar surfaces in a field of view of visual sensors of electronic device 101.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. The communication interface 170 may include, for example, a radio frequency (RF) transceiver, a BLUETOOTH transceiver, or a wireless fidelity (WI-FI) transceiver, and the like.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN)) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

The embodiment of device 100 illustrated in FIG. 1 is for illustration only, and other configurations are possible. The embodiment of the device 100 shown in FIG. 1 is for illustration only. It is further noted that suitable devices come in a wide variety of configurations, and FIG. 1 does not limit the scope of this disclosure to any particular implementation of a device. For example, while certain embodiments according to this disclosure are described as being implemented on mobile XR platforms, embodiments according to this disclosure are not so limited, and embodiments implemented on other platforms are within the contemplated scope of this disclosure.

Figure 2:
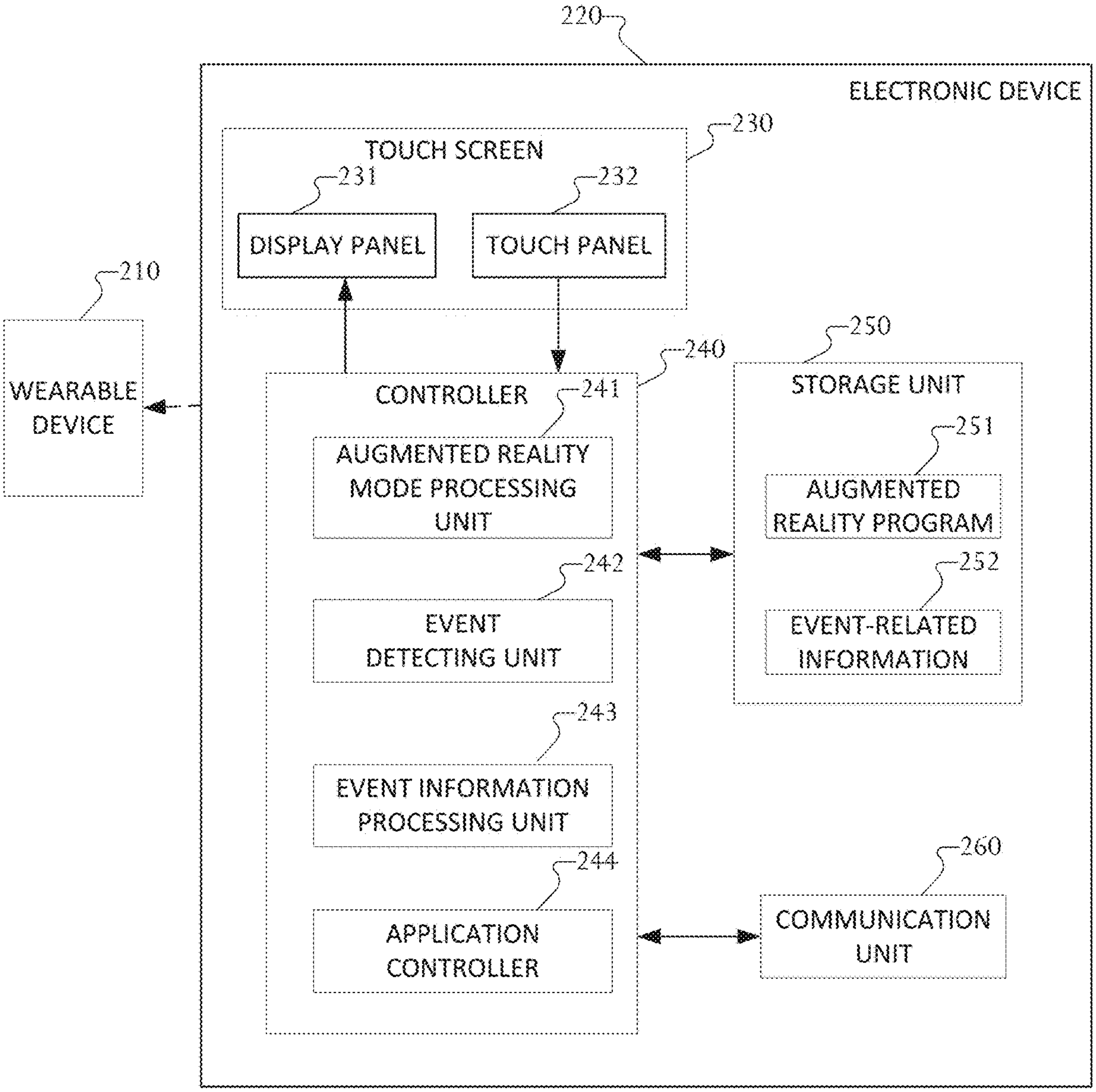
FIG. 2 illustrates an example electronic device according to an embodiment of the present disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

In certain embodiments, an electronic device 220 is an HMD that includes display or touchscreen 230. In certain embodiments, the electronic device 220 includes display panel 231 without a touch screen option. According to various embodiments, the display panel 231 can display, in an internally facing direction (e.g., in a direction having a component that is opposite to arrow 201) items of XR content in conjunction with views of objects in an externally facing field of view. According to some embodiments, the display panel 231 is substantially transparent (similar to, for example, the displays used in "smart glasses" or "heads-up displays" on the cockpit glass of an airplane) and views of objects in externally facing fields of view come from light passing through display. According to various embodiments, (sometimes referred to as "mixed reality") the display panel 231 is opaque, and views of objects in externally facing fields of view come from image data from externally oriented cameras (for example, externally oriented camera 195).

In certain embodiments, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231 but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a WI-FI connection, a WI-FI disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected to a wearable device, the controller can perform control to run the augmented reality mode. According to certain embodiments, the controller can enable the event-related information to be arranged and processed to be displayed in a three-dimensional (3D) space of the augmented reality mode screen being displayed on a current display screen. According to certain embodiments, the electronic device 220 can include additional sensors such as one or more red, green, blue (RGB) cameras, dynamic vision sensor (DVS) cameras, 360-degree cameras, or a combination thereof.

Figure 3:
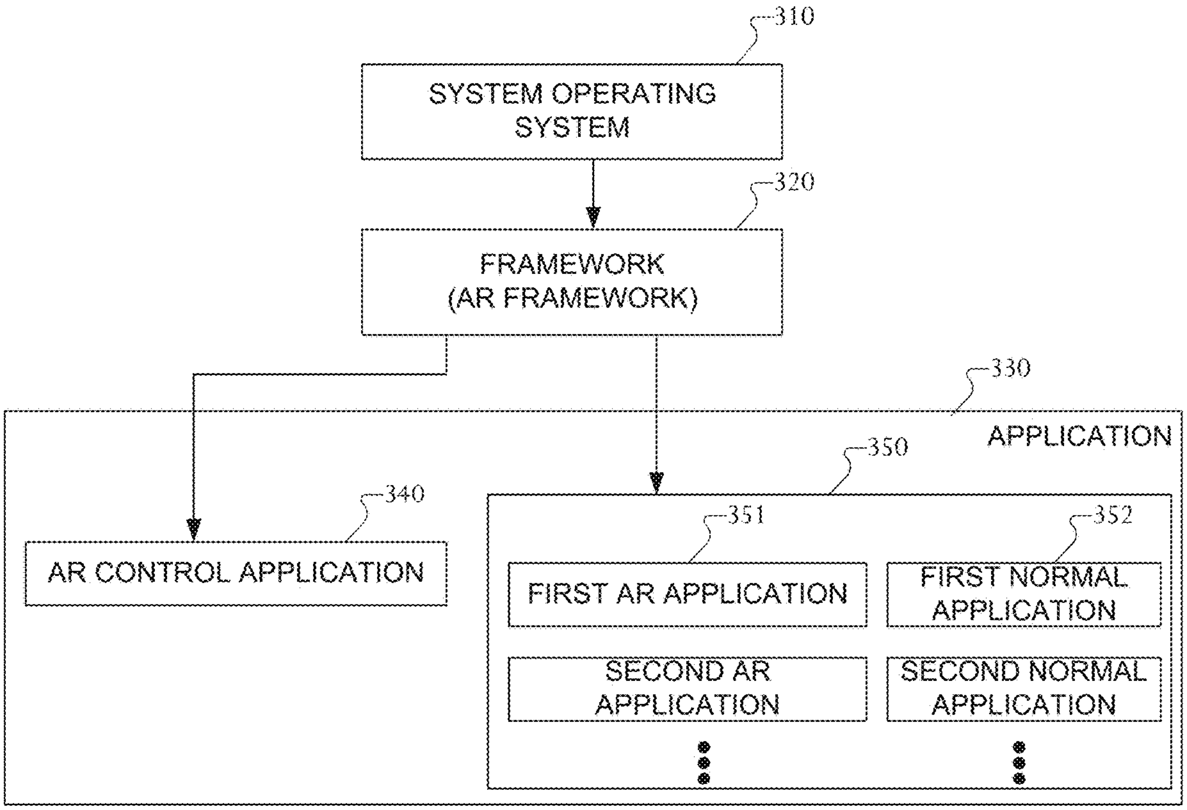
FIG. 3 is a block diagram illustrating a program module according to an embodiment of the present disclosure.
Figure 4A:
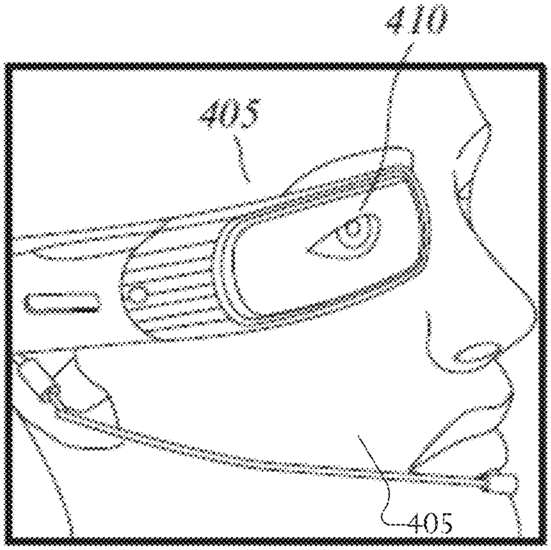
FIGS. 4A-4D illustrate examples of a head mounted display (HMD) for use in augmented reality, mixed reality, or virtual reality according to an embodiment of the present disclosure.
Figure 4B:
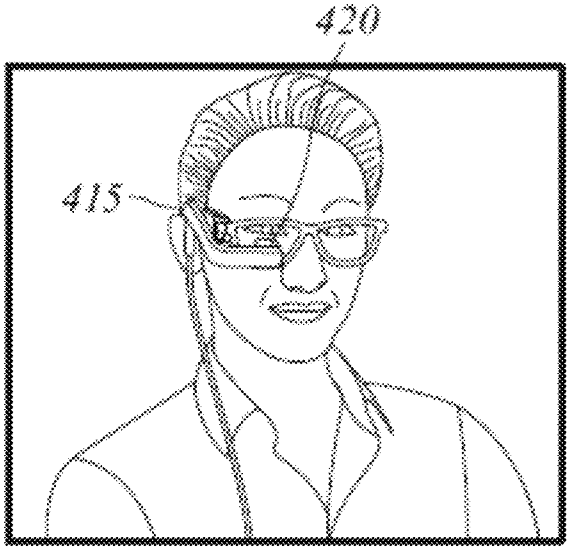
Figure 4C:
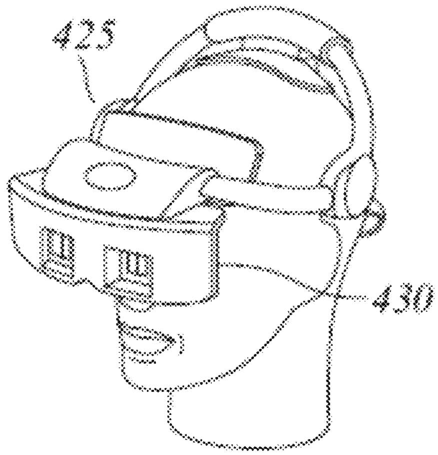
Figure 4D:
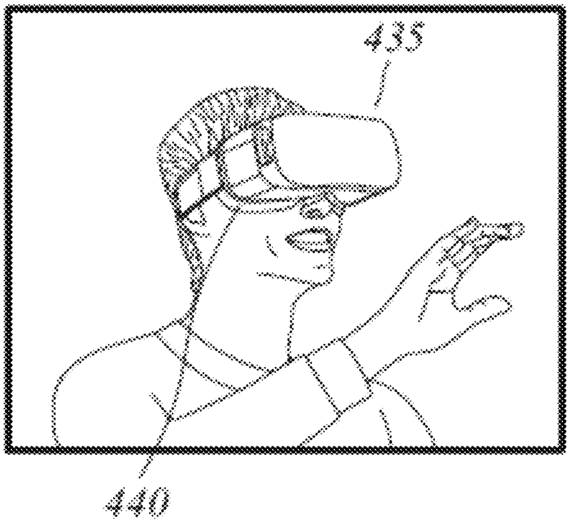

FIG. 3 is a block diagram illustrating a program module according to an embodiment of the present disclosure. The embodiment illustrated in FIG. 3 is for illustration only and other embodiments could be used without departing from the scope of the present disclosure.

In the example shown in FIG. 3, although an augmented reality (AR) system is depicted, at least some embodiments of the present disclosure apply equally to a virtual reality (VR) and the augmented reality (AR). Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a BLUETOOTH driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application 330 can include a plurality of applications and can include at least one AR application 351 running in the augmented reality mode and at least one normal application 352 running in a non-augmented reality mode, which is not the augmented reality mode.

The application 330 can further include an AR control application 340. An operation of the at least one AR application 351 and/or at least one normal application 352 can be controlled under the control of the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates on the background so as not to influence the screen by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In world elements are elements that move in relation to the real or virtual environment itself (i.e., move in relation to the environment itself). Depending on the object, in world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

FIGS. 4A-4D illustrate examples of a head mounted display (HMD) for use in augmented reality, mixed reality, or virtual reality according to an embodiment of this disclosure. The embodiments of the HMDs shown in FIGS. 4A-4D are for illustration only and other configurations could be used without departing from the scope of the present disclosure.

The HMD can generate an augmented reality environment in which a real-world environment is rendered with augmented information. The HMD can be monocular or binocular and can be an opaque, transparent, semi-transparent or reflective device. For example, the HMD can be a monocular electronic device 405 having a transparent screen 410. A user is able to see through the screen 410 as well as able to see images rendered, projected or displayed on the screen 410. The images may be projected onto the screen 410, generated or rendered by the screen 410 or reflected on the screen 410. In certain embodiments, the HMD is a monocular electronic device 415 having an opaque or non-see-through display 420. The non-see-through display 420 can be a liquid crystal display (LCD), a Light emitting diode (LED), active-matrix organic light emitting diode (AMO- LED), or the like. The non-see-through display 420 can be configured to render images for viewing by the user. In certain embodiments, the HMD can be a binocular electronic device 425 having a transparent screen 430. The transparent screen 430 can be a single contiguous screen, such as adapted to be viewed by, or traverse across, both eyes of the user. The transparent screen 430 also can be two transparent screens in when one screen is disposed corresponding to a respective eye of the user. The user is able to see through the screen 430 as well as able to see images rendered, projected or displayed on the screen 430. The images may be projected onto the screen 430, generated or rendered by the screen 430 or reflected on the screen 430. In certain embodiments, the HMD is a binocular electronic device 435 having an opaque or non-see-through display 440. The HMD can include a camera or camera input configured to capture real-world information and display, via the non-see-through display 440, real-world information. The non-see-through display 440 can be an LCD, LED, AMOLED, or the like. The non-see-through display 440 can be configured to render images for viewing by the user. The real-world information captured by the camera can be rendered as a video image on the display with augmented information.

Embodiments of the present disclosure relate to a system and method for optical calibration of an HMD. A significant issue with the current technology is that deformations in image presentation may result extremely blurred image regions in some cases. The blurred image regions may cause nausea, dizziness or generally ill feelings in the user of the HMD. Certain embodiments of the present disclosure provide an algorithm to encode and decode distortions of pixels in images passing through a lens or multiple lenses. The image patterns can be different formats such as binary gray code patterns, color patterns. Certain embodiments of the present disclosure provide an algorithm to calibrate distortions with ray tracing approaches. The algorithm to calibrate distortions with ray tracing approaches maps pixels on the distorted panel to camera pixels and to ray directions for distortion computing. Certain embodiments of the present disclosure provide an algorithm to encode distortion and chromatic aberration with angular distortion for optical pipeline in the Field of View (FOV) space. Certain embodiments of the present disclosure provide algorithm to calibrate distortion center and a FOV with calibrated distortion.

Figure 5:
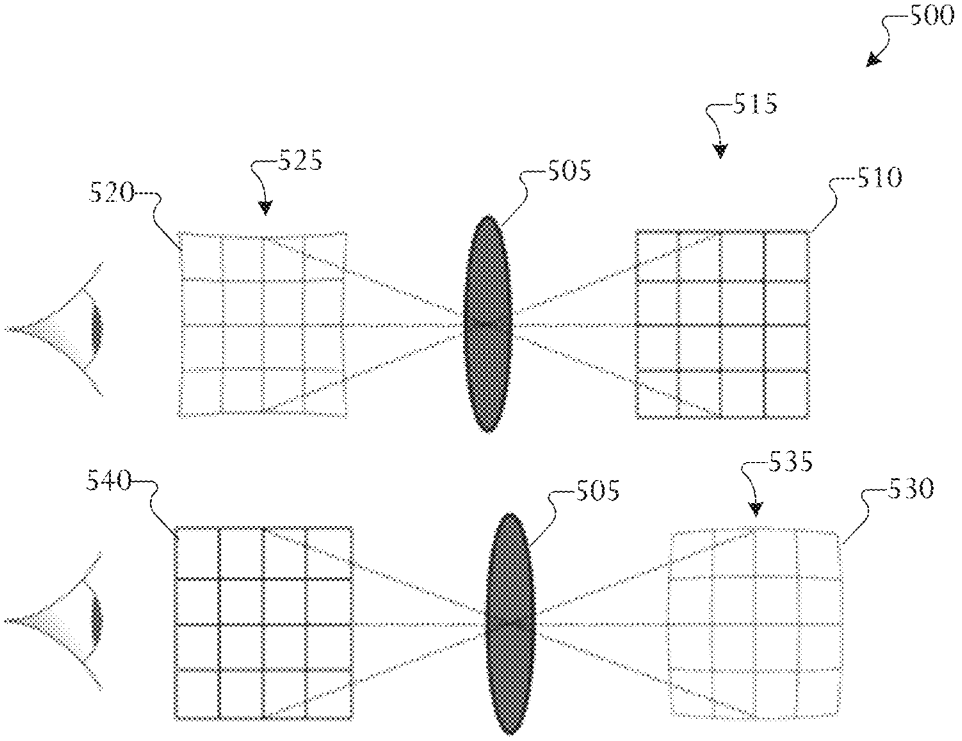
FIG. 5 illustrates example geometric distortion according to the present disclosure.

FIG. 5 illustrates example geometric distortion according to the present disclosure. The embodiment of the geometric distortion 500 shown in FIG. 5 is for illustration only. Other embodiments could be used without departing from the scope of the present disclosure.

In the example shown in FIG. 5, the geometric distortion 500 is created by a lens 505. When a regular rectangular grid 510 is rendered to a display 515, such as display panel 231 of electronic device 220, the operator may see a grid 520 with pincushion distortion 525 through the lens 505. Alternatively, when a grid 530 with barrel distortion 535, which is the reverse of the pincushion distortion, is rendered to the display 515, the operator may see a regular rectangular grid 540 through the lens. Thus, the example shown in FIG. 5 illustrates the concept of lens geometric distortion and correction.

Figure 6:
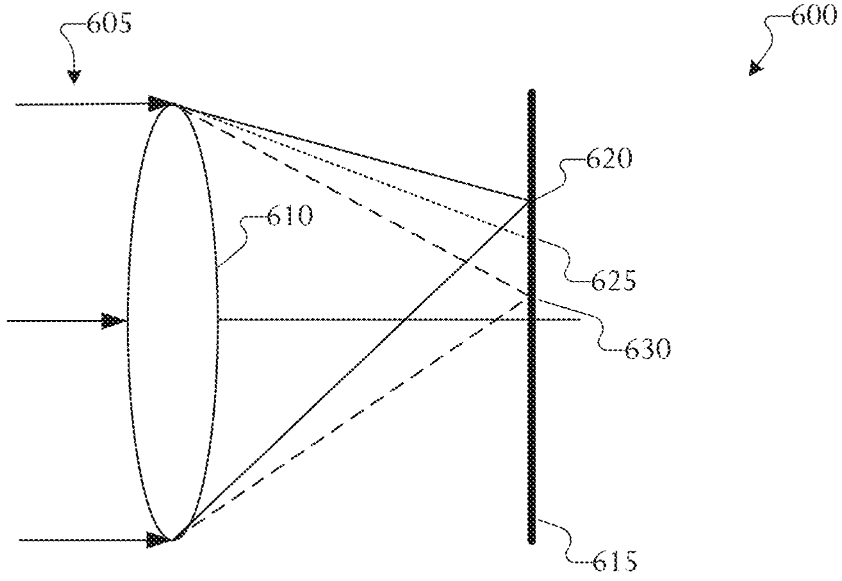
FIG. 6 illustrates example lateral chromatic aberration of a lens according to the present disclosure.

FIG. 6. illustrates example lateral chromatic aberration of a lens according to the present disclosure. The embodiments of the lateral chromatic aberration 600 shown in FIG. 6 is for illustration only. Other embodiments could be used without departing from the scope of the present disclosure.

Lateral chromatic aberration happens when different wavelengths of color coming at an angle focus at different positions along the same focal plane. In the example shown in FIG. 6, light 605 from an image traverses through a lens 610 towards an image focal plane 615, such as display panel 231 of electronic device 220. Light of a first wavelength is focused on a first point 620 of the focal plane 615 while light of a second wavelength is incident at a second point 625 and light of a third wavelength is incident at a third point 630 on the image focal plane 615.

Figure 7:
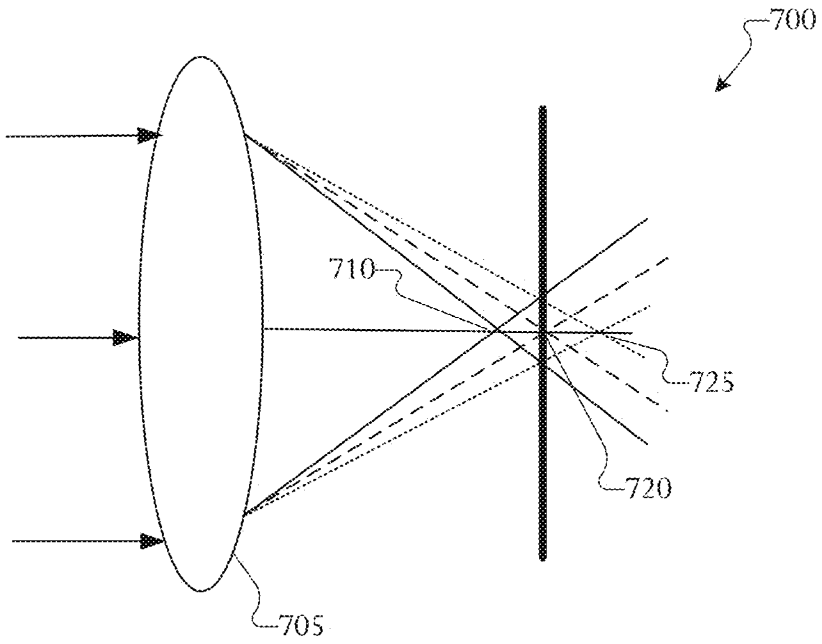
FIG. 7 illustrates longitudinal chromatic aberration of a lens according to the present disclosure.

FIG. 7 illustrates longitudinal chromatic aberration of a lens according to the present disclosure. The example of longitudinal chromatic aberration 700 shown in FIG. 7 is for illustration only. Other embodiments could be used without departing from the scope of the present disclosure.

Longitudinal chromatic aberration occurs when different wavelengths of color do not converge at the same point after passing through the lens 705. Light of a first wavelength is focused at a first point 710 before the image focal plane 715 while light of a second wavelength is incident at a second point 720, which is on the image focal plane 715, and light of a third wavelength is incident at a third point 725 beyond the image focal plane 715.

Embodiments of the present disclosure provide a device, system, and method configured to perform optical calibration and distortion correction on an HMD. Optical calibration and distortion correction can improve the quality of image and video views on an HMD.

Figure 8:
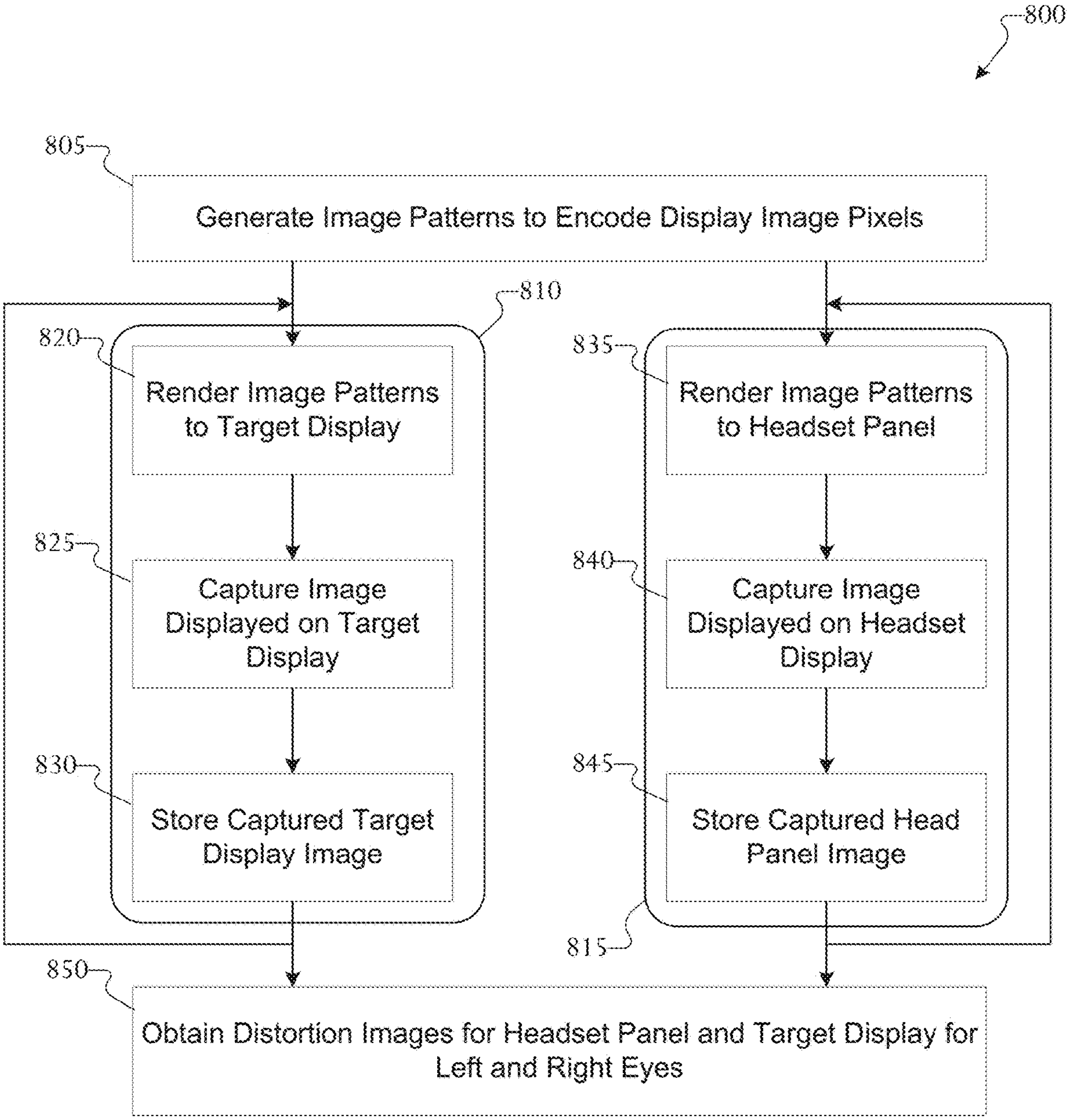
FIG. 8 illustrates a process for distortion capture according to an embodiment of the present disclosure.

FIG. 8 illustrates a process for distortion capture according to an embodiment of the present disclosure. While FIG. 8 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted can be implemented by one or more processors in an electronic calibration and distortion correction (CDC) device, such as by one or more processors 120 of an electronic device 101.

In certain embodiments, a CDC device (or system) includes two main parts for distortion capture and distortion calibration. The CDC device is configured to perform a process 800 of distortion capture for headset panels and target display such as TV display and also perform a process 900, described with respect to FIG. 9, for distortion calibration for AR/VR headsets.

In operation 805, the CDC device, generates image patterns to encode display image pixels. The number of image patterns depends on the resolution of the display image. Then, the CDC device applies these image patterns to encode distortions on target display and headset panels. That is, the CDC device processes all pattern images in a target display distortion capture process 810 for target display and a headset panel distortion capture process 815 for the headset panel.

For the target display distortion capture process 810, in operation 820, the CDC device renders the image patterns on the target display. In operation 825, the CDC device captures images of the target display with a camera, such as camera 195. In certain embodiments, the CDC device uses two cameras 195, such as a camera for a left eye and a camera for a right eye. The cameras for left and right eyes are pre-aligned with the target display and headset lenses and panels. In operation 830, the CDC device stores the captured target display images (also referred herein as "target display pattern images" or "distortion images for target display") for use in distortion calibration process 900. The CDC device repeats the target display distortion capture process 810 for all image patterns and both left and right eyes.

For the headset panel distortion capture process 815, in operation 835, the CDC device renders the image patterns on the headset panel. In operation 840, the CDC device 431 and captures images of the panel with the same camera 195 with the same alignment as used in the target display distortion capture process 810. In operation 840, the camera 195 captures the images on the headset panel through headset lenses. In operation 845, the CDC device stores the captured panel images (also referred herein as "panel pattern images" or "distortion images for headset panel") for use in the distortion calibration process 900. The CDC device repeats the panel distortion capture process 815 for all image patterns and for both left and right eyes.

Thereafter, in operation 850, the CDC device obtains distortion images for headset panels and target display for left and left and right eyes 440. The CDC device obtains the distortion images from target display from operation 830 and the distortion images for headset panel from operation 845.

Figure 9:
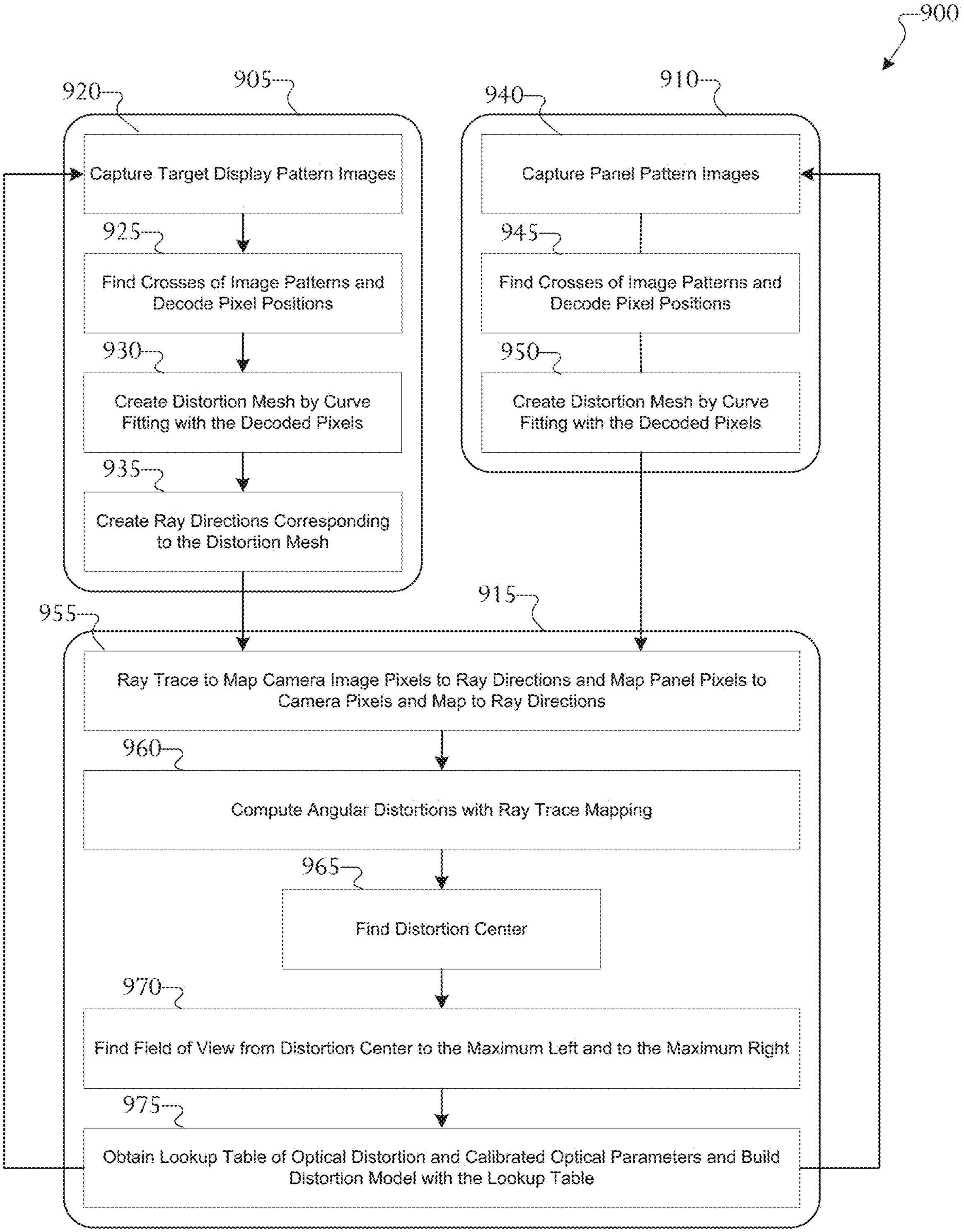
FIG. 9 illustrates a process for distortion calibration according to an embodiment of the present disclosure.

FIG. 9 illustrates a process for distortion calibration according to an embodiment of the present disclosure. While FIG. 9 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 900 depicted can be implemented by one or more processors in an electronic CDC device, such as by one or more processors 120 of an electronic device 101.

In the distortion calibration process 900 shown in FIG. 9, the CDC device analyzes a target display distortion to create ray directions for ray tracing in target display distortion analysis 905. The CDC device also analyzes headset panel distortion to create panel distortion analysis 910. The CDC device then computes angular distortions to calibrate the panel distortion in panel distortion calibration process 915.

In the target display distortion analysis 905, in operation 920, the CDC device loads the captured target display pattern images. In operation 925, the CDC device finds the crosses of image patterns and decodes pixel position. That is, the CDC device identifies matching portions in the generated image pattern and in target display patterns and decodes the corresponding pixel positions of these crosses of the image patterns. In operation 930, the CDC device creates a distortion mesh by curve fitting with the decoded pixel positions. The CDC device curve fits one or more decoded pixel positions corresponding to the identified crosses in the image patterns. The curve fitting of multiple decoded points creates a mesh corresponding to the distortion in the different paths, i.e., different lenses, in the right and left eyes. With the distortion mesh and corresponding camera image, the CDC device creates camera ray directions for ray tracing in distortion calibration in operation 935. In the ray tracing, the CDC device calculates the path of travel of light from the image and corresponding to the distortion mesh. The CDC device uses a ray tracing algorithm to trace the images before distortion and after distortion. That is, the ray tracing algorithm determines different ray traces from the originally generated images and the corresponding captured target display pattern images.

In the panel distortion analysis 910, in operation 940, the CDC device loads the captured panel pattern images. In operation 945, the CDC device finds crosses of image patterns and decodes pixel positions for the headset display panel. In operation 950, the CDC device creates a distortion mesh by curve fitting with the decoded pixel positions.

In the panel distortion calibration 915, in operation 955, the CDC device first maps camera image pixels to ray directions that were created in target display distortion analysis 905. That is, the ray tracing from operation 935 is used to map the camera image pixels to respective positions on the target display. The CDC device then maps panel pixels to camera image pixels and then further maps the panel pixels to the ray directions that were created in panel distortion analysis 910. That is, the CDC obtains a camera image of the target display image and maps the respective camera images and panel display image to the ray tracing for the target display image. In this way, a map between panel pixels and ray directions is created and the two images, from the target display and the panel display, can be compared. In operation 960, the CDC device computes angular distortions with the ray trace mapping for all pixels on the distortion mesh. That is, the CDC computes the change in relative positions for each pixel based on the ray trace mapping and the distortion mesh. In operation 965, the CDC device extracts a distortion center using the computed distortion mesh. In operation 970, the CDC device finds a field of view from the distortion center to the maximum left and to the maximum right. Finally, in operation 975, the CDC device obtains a lookup table of optical distortion and calibrated optical parameters and builds distortion model with the distortion lookup table. The lookup table includes values to express the distortion based on the ray tracing. The CDC device can use the lookup table to compensate for distortion by adjusting the pixel positions based on the respective values in the lookup table. In certain embodiments, a model is created that compensates for the distortion. The distortion model can be a polynomial model, a cubic model, or a spline model, that expresses the optical distortion quantified in the lookup table. The distortion model uses mathematical equations to recreate the distortion of the optical path and, as such, can be used as a calibration tool to correct for the optical distortion. The CDC device repeats the calibration process 900 for both left and right eyes to obtain distortion calibration for the head mounted display.

Figure 10:
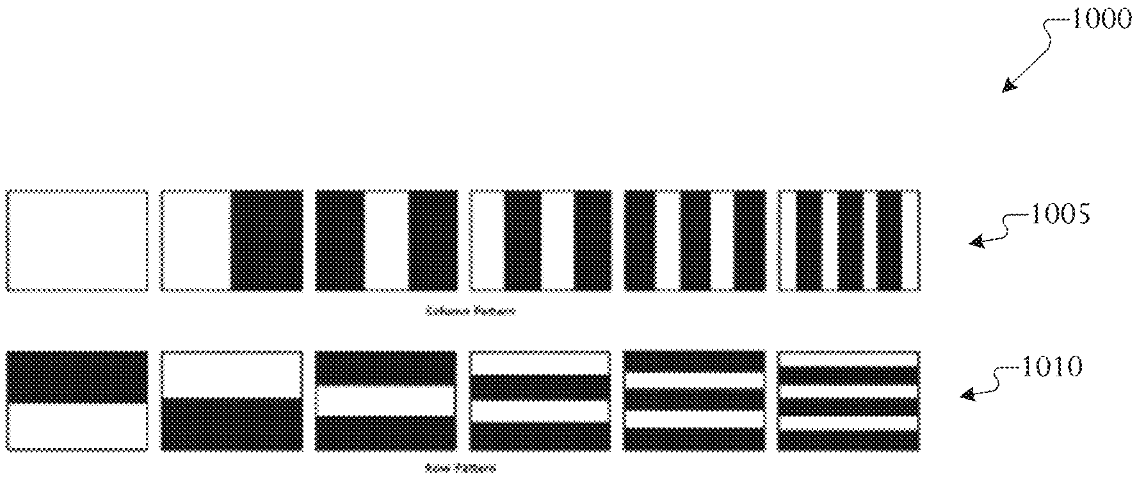
FIGS. 10 and 11 illustrate code patterns according to an embodiment of the present disclosure.
Figure 11:
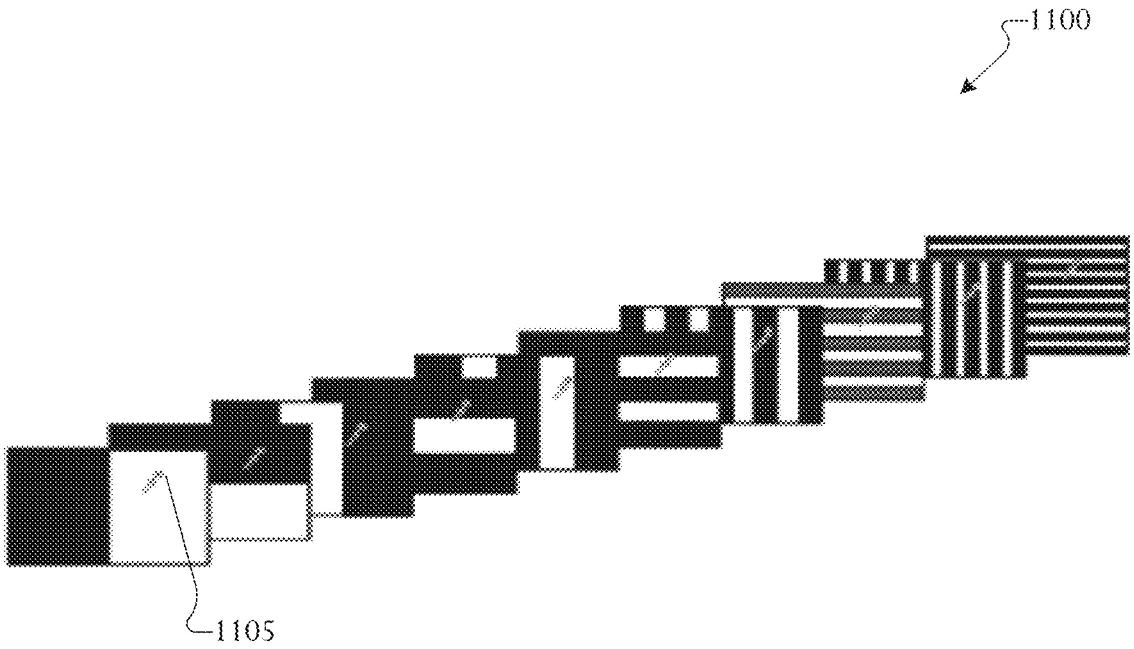

FIGS. 10 and 11 illustrate code patterns according to an embodiment of the present disclosure. The embodiments of the code patterns 1000 and 1100 shown in FIGS. 10 and 11 respectively are for illustration only. Other embodiments could be used without departing from the scope of the present disclosure.

To obtain high accuracy, less manual interventions, and robust detection, the CDC device utilizes image patterns for encoding distortion. In certain embodiments, binary gray codes are used as an example for distortion encoding. The CDC device encodes each pixel position with gray codes and displays gray code patterns on the display and panels. After capturing the distortions of the gray code patterns, the CDC device can analyze and find the distortions of the pixels with ray tracing. Finally, the CDC device can compute the distortion of the optical pipeline.

In certain embodiments, gray codes are designed according to the resolutions of the target display and the AR panels. With the designed gray codes, the CDC device can design gray code patterns that are required in the distortion capture system. In the example shown in FIG. 10, some gray code patterns 1000 corresponding to binary gray codes are depicted. The gray code patterns 1000 include column patterns 1005 and row patterns 1010.

Different combinations of the gray code patterns are used to represent the positions of pixels in the display. In the example shown in FIG. 11, an example of gray code pattern images decoding the bit string 1000110101 as a point on the display. Therefore, each pixel 1105 on the display has a corresponding bit string. After capturing and analyzing the designed gray code patterns 1100 shown on the display, the CDC device can locate positions of pixels after distorting.

Figure 12:
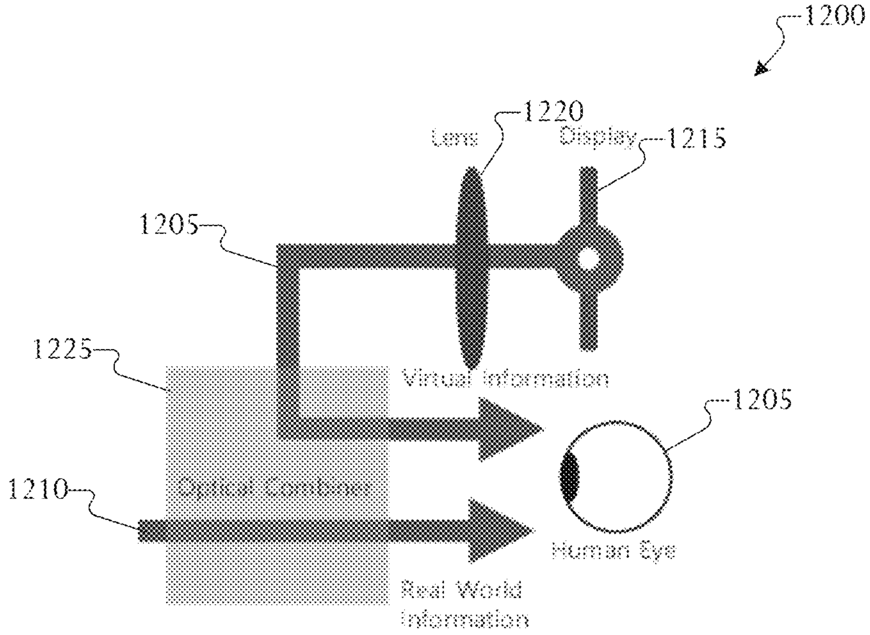
FIG. 12 illustrates an optic pipeline for a head-mounted display according to an embodiment of the present disclosure.

FIG. 12 illustrates an optic pipeline for a head-mounted display according to an embodiment of the present disclosure. The embodiment of the optic pipeline 1200 shown in FIG. 12 is for illustration only. Other embodiments could be used without departing from the scope of the present disclosure.

In the example shown in FIG. 12, the optic pipeline 1200 is configured as an optic pipeline for an optical see-through (OST) AR headset. Similar to VR headsets, the rendered virtual information goes through a lens to reach human eyes. Unlike VR headsets, there is another information source from real world to reach human eye after overlapping with the virtual information by combiner.

The optic pipeline 1200 for an OST includes two optic paths 1205 and 1210. In the first optic path 1205, a display panel 1215, such as display panel 231 of an HMD, displays an image. The image from display panel 1215, corresponding to virtual information, traverses through the HMD lens 1220. For example, light from the image from display panel 1215 traverses along first optic path 1205. Concurrently, light from a real-world environment, corresponding to real-world information, enters the HMD OST device along the second optic path 1210. An optic combiner 1225 receives information from both optic paths 1205 and 1210 and the virtual information from the first optic path 1205 with the real-world information from the second optic path 1210.

As shown in the example illustrated in FIG. 12, the virtual information traverses through the HMD lens 1220. The HMD lens 1220 can cause distortion that needs to be corrected.

Figure 13:
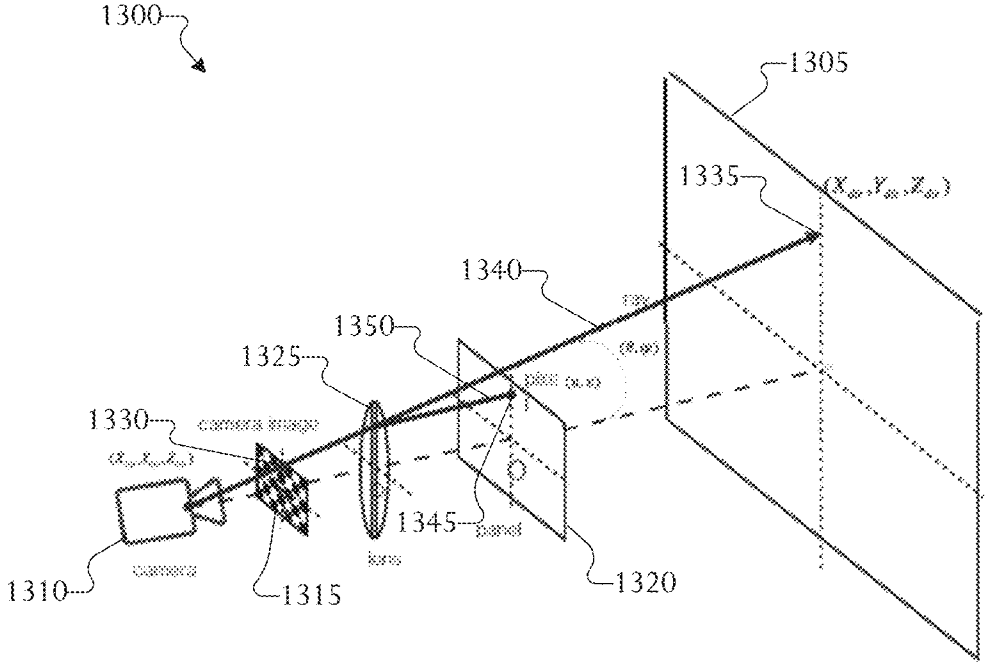
FIGS. 13 and 14 illustrate distortion calibration according to an embodiment of the present disclosure.
Figure 14:
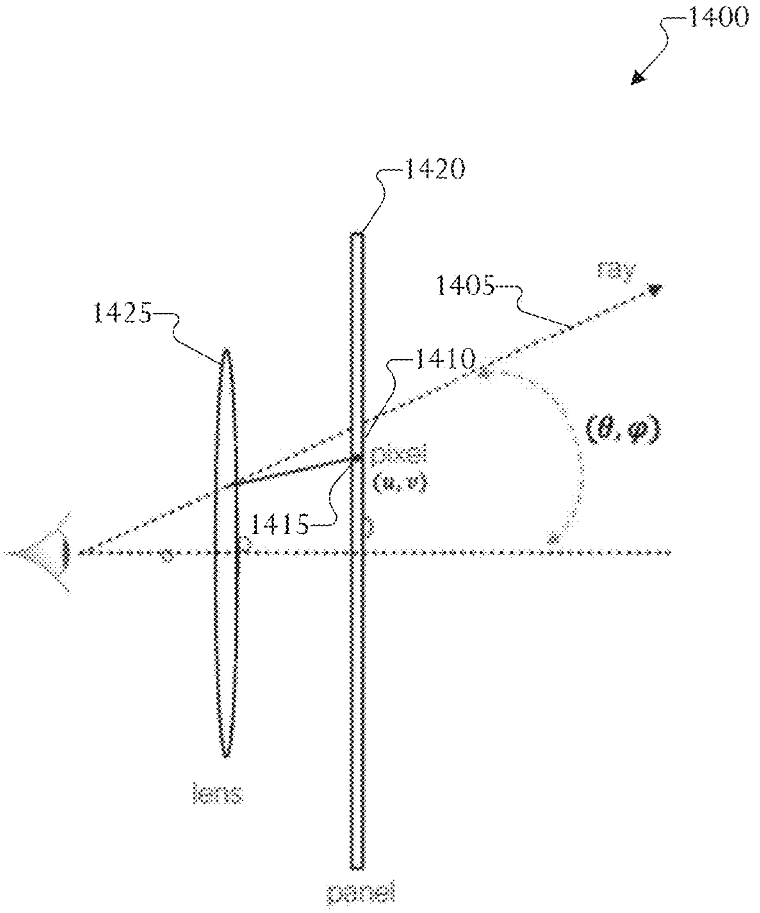

FIGS. 13 and 14 illustrate distortion calibration according to an embodiment of the present disclosure. The embodiments of the distortion calibration 1300 and 1400 shown in FIGS. 13 and 14 respectively are for illustration only. Other embodiments could be used without departing from the scope of the present disclosure.

The example for distortion calibration 1300 illustrated in FIG. 13 illustrates an optical calibration strategy for the OST AR optic pipeline 1200. To address distortion that may occur in the OST AR HMD, the CDC device is configured to capture panel distortion by seeing through the lens and capture a target display distortion without the AR optics by placing a target to the position of virtual image. The CDC device also is configured to analyze these two kinds of distortion with ray tracing and compute distortion of the OST AR optics pipeline 1200.

In certain embodiments, the CDC device can capture pictures of image patterns rendered on headset panel and decode the bit strings as the points on the panel. In certain embodiments, to obtain clear images of the rendered information from the optics pipeline, the CDC device captures the images in a dark environment. In certain embodiments, the CDC device includes and algorithm that is configured to enable the CDC device to extract row curves with the row pattern images and column curves with column pattern images. Due to the noise and blurring, the CDC device may be unable to obtain the full curves. Accordingly, the CDC device uses interpolation such as Spline, Bilinear, and the like, and curve fitting during the curve extraction.

In the example shown in FIG. 13, a target display 1305 (television) generates an image and an external camera 1310 is positioned to capture the image 1315 generated by the target display 1305. That is, in an initial pass, the camera 1310 captures the image 1315 without the OST AR HMD such that the image is unaffected by the lens 1325. The camera 1310 can capture one or multiple images displayed by the target display 1305.

Thereafter, the OST AR HMD is placed in the path between the camera 1310 and the target display 1305. The OST AR HMD includes display panel 1320 and lens 1325. The camera 1310 then captures the image 1315 from display panel 1320 and as distorted by lens 1325.

The example shown in FIG. 13 illustrates the space match with distortion grids from target display 1305 and headset panel 1320. Since the target display 1305 is placed in the position of the virtual image, the panel distortion is matched to the virtual image in 3D space. First the point 1330 on camera image 1315 to the point 1335 on virtual image (target display 1305) with ray tracing and the ray direction 1340 to the target display 1305 is computed. Then the point 1345 on the panel 1320 with the point 1330 on camera image 1315 is identified. Additionally, ray tracing and the ray direction 1350 to the panel 1320 is computed. Finally, the point 1345 on the panel 1320 is matched to the computed ray direction 1340. That is, the CDC device can determine that both points 1335 and 1345 appear at the same location on the lens 1325. Although point 1335 is at a different location than point 1345, distortion causes both points 1335 and 1345 to appear at the same location on the HMD due to the distortion of the lens 1325. The CDC device can compare points 1335 and 1345 to determine the distortion of the lens 1325.

Since the virtual image distances may change when using different AR headsets, calibration in 3D space needs to be computed as opposed to just computing in a certain plane. The CDC device includes an algorithm that creates angular calibration. As shown in the example shown in FIG. 13, to calibrate the HMD, a target placed corresponding to the designed virtual image plane and to match distortions. After obtaining the points in the matched distortions, the CDC device is configured to computes ray directions 1405 and angular distortion 1410 as shown in FIG. 14. That is, the CDC device calculates angular distortion 1410 for a point 1415 on panel 1420 that is caused by lens 1425.

To calculate the angular distortion 1410, the CDC device can compute distortions in every virtual image plane when the distance of the virtual image plane changes. In this way, the CDC device can perform distortion calibration in 3D virtual space. Since the optics pipeline may have various kinds of distortions created by the lens design, lens pose, and other optics in the pipeline, the CDC can model a radial distortion and tangential distortion corresponding to the respective lens design. The radial distortion and tangential distortion can be modeled by polynomial functions. In certain embodiments, the CDC device includes an algorithm that creates accurate calibration for AR panel distortion. The CDC device can compute angular correction at each point with the angular distortion and can create a lookup table to store the angular corrections for all points. That is, based on the determined distortion, the CDC device generates a compensation factor for the distortion. In certain embodiments, for lateral chromatic aberration correction, the CDD device creates three lookup tables for red, green, and blue colors respectively, so that the CDC device can apply the respective red, green, and blue lookup tables to correct corresponding color channels. After obtaining distortion correction lookup tables, the CDC device can apply the distortion correction to each point of the AR virtual frame, such that the CDC device can correct geometric distortion and lateral chromatic aberration for the AR virtual frame. In certain embodiments, the CDC device can recompute a position of each pixel using the distortion correction lookup tables. The CDC device then can render the corrected frame to the AR panel to provide virtual information for the OST AR pipeline in the HMD.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for display calibration comprising:

generating an image pattern to encode display image pixels;

transmitting the image pattern to be rendered on a target display;

rendering the image pattern on a display panel of a head-mounted device (HMD);

capturing, using at least one image sensor of the HMD and through a lens of the HMD, the image pattern on the target display and the image pattern on the display panel with a same alignment as the image pattern on the target display;

determining a distortion of the image pattern resulting from the lens of the HMD based on differences between the image pattern on the target display and the image pattern on the display panel; and providing a compensation factor for the distortion.

2. The method of claim 1, wherein determining the distortion comprises:

comparing pixel positions of the image pattern on the target display and the image pattern on the display panel; and determining the distortion based on the compared pixel positions.

3. The method of Claim 2, wherein providing the compensation factor comprises:

decoding the pixel positions for portions of the image pattern on the display panel that match portions of the image pattern on the target display;

creating a lookup table of angular distortion based on computing angular correction for the decoded pixel positions; and creating distortion correction based on the lookup table of angular distortion.

4. The method of claim 3, wherein providing the compensation factor further comprises:

creating a distortion model based on the lookup table of angular distortion, wherein the distortion model comprises a mathematic form including a polynomial model, a cubic model, or a spline model.

5. The method of claim 3, wherein providing the compensation factor comprises:

creating different models for different color channels, wherein each model comprises a corresponding lookup table of angular distortion for chromatic aberration correction.

6. The method of claim 3, further comprising:

extracting a distortion center based on the lookup table of angular distortion, wherein the distortion center is a point with no distortion;

finding a field of view based on the distortion center; and constructing a distortion model based on the field of view.

7. The method of claim 1, wherein the HMD comprises one of:

a virtual display device; or an optical see-through (OST) augmented reality (AR) headset.

8. An apparatus, comprising:

a display panel;

a lens;

at least one image sensor; and at least one processor configured to:

generate an image pattern to encode display image pixels;

transmit the image pattern to be rendered on a target display;

render the image pattern on the display panel;

capture, using the at least one image sensor and through the lens, the image pattern on the target display and the image pattern on the display panel with a same alignment as the image pattern on the target display;

determine a distortion of the image pattern resulting from the lens based on differences between the image pattern on the target display and the image pattern on the display panel; and provide a compensation factor for the distortion.

9. The apparatus of claim 8, wherein, to determine the distortion, the at least one processor is configured to:

compare pixel positions of the image pattern on the target display and the image pattern on the display panel; and determine the distortion based on the compared pixel positions.

10. The apparatus of claim 9, wherein, to provide the compensation factor, the at least one processor is configured to:

decode the pixel positions for portions of the image pattern on the display panel that match portions of the image pattern on the target display;

create a lookup table of angular distortion based on computing angular correction for the decoded pixel positions; and create distortion correction based on the lookup table of angular distortion.

11. The apparatus of claim 10, wherein, to provide the compensation factor, the at least one processor is configured to:

create a distortion model based on the lookup table of angular distortion, wherein the distortion model comprises a mathematic form including a polynomial model, a cubic model, or a spline model.

12. The apparatus of claim 10, wherein, to provide the compensation factor, the at least one processor is configured to:

create different models for different color channels, wherein each model comprises a corresponding lookup table of angular distortion for chromatic aberration correction.

13. The apparatus of claim 10, wherein the at least one processor is further configured to:

extract a distortion center based on the lookup table of angular distortion, wherein the distortion center is a point with no distortion;

find a field of view based on the distortion center; and construct a distortion model based on the field of view.

14. The apparatus of claim 8, wherein the apparatus comprises one of:

a virtual display device; or an optical see-through (OST) augmented reality (AR) headset.

15. A non-transitory computer-readable medium containing instructions that, when executed by at least one processor, cause the at least one processor to:

generate an image pattern to encode display image pixels;

transmit the image pattern to be rendered on a target display;

render the image pattern on a display panel of a head-mounted device (HMD);

capture, using at least one image sensor of the HMD and through a lens of the HMD, the image pattern on the target display and the image pattern on the display panel with a same alignment as the image pattern on the target display;

determine a distortion of the image pattern resulting from the lens of the HMD based on differences between the image pattern on the target display and the image pattern on the display panel; and provide a compensation factor for the distortion.

16. The non-transitory computer-readable medium of claim 15, wherein the instructions that when executed cause the at least one processor to determine the distortion comprise instructions that when executed cause the at least one processor to:

compare pixel positions of the image pattern on the target display and the image pattern on the display panel; and determine the distortion based on the compared pixel positions.

17. The non-transitory computer-readable medium of claim 16, wherein the instructions that when executed cause the at least one processor to provide the compensation factor comprise instructions that when executed cause the at least one processor to:

decode the pixel positions for portions of the image pattern on the display panel that match portions of the image pattern on the target display;

create a lookup table of angular distortion based on computing angular correction for the decoded pixel positions; and create distortion correction based on the lookup table of angular distortion.

18. The non-transitory computer-readable medium of claim 17, wherein the instructions that when executed cause the at least one processor to provide the compensation factor comprise instructions that when executed cause the at least one processor to:

create a distortion model based on the lookup table of angular distortion, wherein the distortion model comprises a mathematic form including a polynomial model, a cubic model, or a spline model.

19. The non-transitory computer-readable medium of claim 17, further containing instructions that, when executed by the at least one processor, cause the at least one processor to:

create different models for different color channels, wherein each model comprises a corresponding lookup table of angular distortion for chromatic aberration correction.

20. The non-transitory computer-readable medium of claim 17, further containing instructions that, when executed by the at least one processor, cause the at least one processor to:

extract a distortion center based on the lookup table of angular distortion, wherein the distortion center is a point with no distortion;

find a field of view based on the distortion center; and construct a distortion model based on the field of view.

* * * * *